(12) United States Patent
Dolbeau et al.

(10) Patent No.: US 11,307,883 B2
(45) Date of Patent: Apr. 19, 2022

(54) OPTIMIZATION OF THE EXECUTION TIME OF A COMPUTER PROGRAM BY DETERMINING THE IMPLEMENTATION OF A FUNCTION ACCORDING TO RANGE OF INPUT PARAMETERS AND ACCURACY

(71) Applicant: BULL SAS, Les Clayes sous Bois (FR)

(72) Inventors: Romain Dolbeau, Rennes (FR); David Guibert, Nantes (FR)

(73) Assignee: BULL SAS, Les Clayes sous Bois (FR)

( * ) Notice: Subject to any disclaimer, the term of this patent is extended or adjusted under 35 U.S.C. 154(b) by 116 days.

(21) Appl. No.: 16/205,227

(22) Filed: Nov. 30, 2018

(65) Prior Publication Data
US 2019/0163508 A1  May 30, 2019

(30) Foreign Application Priority Data
Nov. 30, 2017 (EP) .................... 17306658

(51) Int. Cl.
*G06F 9/455* (2018.01)
*G06F 8/41* (2018.01)

(52) U.S. Cl.
CPC ........ *G06F 9/45525* (2013.01); *G06F 8/4441* (2013.01)

(58) Field of Classification Search
CPC ........................... G06F 9/45525; G06F 8/4441
USPC ........................................................ 717/153
See application file for complete search history.

(56) References Cited

U.S. PATENT DOCUMENTS

| 2005/0289519 | A1 | 12/2005 | Sazegari et al. | |
|---|---|---|---|---|
| 2008/0040409 | A1 | 2/2008 | Matsuzaki | |
| 2010/0125836 | A1* | 5/2010 | Sazegari et al. ...... | G06F 8/4443 717/151 |
| 2014/0026111 | A1* | 1/2014 | Stitt et al. ............. | G06F 8/4441 717/101 |
| 2015/0309778 | A1* | 10/2015 | Baskaran et al. ..... | G06F 8/4441 717/160 |

(Continued)

OTHER PUBLICATIONS

Foreign Communication from a Related Counterpart Application, Extended European Search Report dated Jun. 5, 2018, European Application No. 17306658.0 filed on Nov. 30, 2017.

(Continued)

*Primary Examiner* — Wei Y Zhen
*Assistant Examiner* — Mohammed N Huda
(74) *Attorney, Agent, or Firm* — Meagher Emanuel Laks Goldberg & Liao, LLP.

(57) ABSTRACT

This invention relates to a method of optimization of a computer program, comprising: a first step ($S_{11}$, $S_{12}$, $S_{13}$, $S_{14}$) of determination of a call of a function having at least one input parameter, said call corresponding to a first criterion according to which said input parameter is inside an interval substantially smaller than the range of possible values for said input parameter, and to a second criterion corresponding to a desired accuracy for said call; a second step ($S_2$) of automatic generation of an executable code for implementing said function, minimizing execution time for said input parameter being within said interval and compliant with said desired accuracy; a third step ($S_3$) of replacing the existing code implementing said function by the executable code generated at said second step.

10 Claims, 1 Drawing Sheet

(56) References Cited

U.S. PATENT DOCUMENTS

2018/0373515 A1* 12/2018 Brown et al. ......... G06F 8/4441

OTHER PUBLICATIONS

Foreign Communication from a Related Counterpart Application, French Search Report and Written Opinion dated Feb. 19, 2020, French Application No. 1872121 filed on Nov. 30, 2018.

* cited by examiner

OPTIMIZATION OF THE EXECUTION TIME OF A COMPUTER PROGRAM BY DETERMINING THE IMPLEMENTATION OF A FUNCTION ACCORDING TO RANGE OF INPUT PARAMETERS AND ACCURACY

CROSS-REFERENCE TO RELATED APPLICATIONS

The present application claims priority to European Application No. 17306658.0 filed with the European Patent Office on Nov. 30, 2017 and entitled "OPTIMIZATION OF THE EXECUTION TIME OF A COMPUTER PROGRAM BY DETERMINING THE IMPLEMENTATION OF A FUNCTION ACCORDING TO RANGE OF INPUT PARAMETERS AND ACCURACY," which is incorporated herein by reference in their entirety for all purposes.

FIELD OF THE INVENTION

The invention relates to the optimization of a computer program in order to improve its execution performances. In particular, the invention applies to the field of computer programs performing calculus tasks.

BACKGROUND OF THE INVENTION

Some computer programs are dedicated to fields like weather forecasting, crash simulation, 3D gaming, etc. which implies massive calculus tasks. The developer of such a computer program writes executable code, in whatever computing language, which at some points call a function in charge of dedicated calculus tasks. The functions may often be made available to the developer by a software library. They can be generic (sine, cosine calculus, etc.) or more specific (3D calculus . . . ). However, in general, the purpose of such libraries is to be application-independent. Accordingly, the algorithm implementing the function needs to be generic so as to apply to a large range of conditions.

On the other hand, it is known that in some more restricted conditions, better performances can be achieved, sometimes balanced by a lesser precision in the result but which would be acceptable in view of the application.

For instance, a trigonometric calculus (sine, cosine . . . ) can be implemented by different algorithms, which aims in finding good digital approximations of the real mathematical calculus. Each algorithm provide respective characteristics in terms of performances, precision (or accuracy), which may depend on conditions of the calculus, like especially the value of the input parameters on which the calculus is performed. In consequence, the developer of a computer program should be cautious for each call of a function whether the implementation of the library can be used, or if a special implementation should preferably be used. The determination of each calls, the choice, and the replacement of the implementing code are steps performed manually by the developers.

Some tools exist to automatically analyze the executable code of a computer program, but none proposes to determine automatically calls of functions, eligible to the replacement of the "default" implementing executable code. In addition, no solution proposes a tool fully automatizing the process of optimizing the computer program regarding the calls of calculus functions.

SUMMARY OF THE INVENTION

The object of the present invention is to alleviate at least partly the above mentioned drawbacks. More particularly, the invention aims to determine eligible calls of functions, and to chain these determinations with the automatic generation of an appropriate executable code, adapted to the conditions of the respective calls, and with the automatic replacement of the former "default" executable code by the generated executable code.

This object is achieved with a method of optimization of a computer program, comprising: a first step of determination within said computer program of a call of a function having at least one input parameter, said call corresponding to a first criterion according to which said at least one input parameter is inside an interval substantially smaller than the range of possible values for said input parameter, and to a second criterion corresponding to a desired accuracy for said call; a second step of automatic generation of an executable code for implementing said function, minimizing execution time for said at least one input parameter being within said interval and compliant with said desired accuracy; a third step of replacing the existing code implementing said function by the executable code generated at said second step.

Preferred embodiments comprise one or more of the following features, which can be taken separately or together, either in partial combination or in full combination: —said first step comprises the automatic triggering of a set of executions for said computer programmer and the automatic analysis of said execution for measuring for each of said calls the value of said at least one parameter so as to determine said interval; —said desired accuracy is determined at least partly on the basis of the environment of said call within said computer program; —said second step comprises generating code expressions, each associated to a term of a mathematical suite approximating said function, wherein the number of said code expressions is determined by said desired accuracy; —said function is a trigonometric function; —said second step consists in generating a first execution code based on Taylor series, or a second execution code based on Chebyshev polynomials; —said second step consists in generating said first execution code based on Taylor series if said interval is close to zero, and said second execution code based on Chebyshev polynomials otherwise.

Another object of the invention consists in a platform for the optimization of a computer program, comprising: means for determining within said computer program of a call of a function having at least one input parameter, said call corresponding to a first criterion according to which said at least one input parameter is inside an interval substantially smaller than the range of possible values for said input parameter, and to a second criterion corresponding to a desired accuracy for said call; a computer program for the automatic generation of an executable code for implementing said function, minimizing execution time for said at least one input parameter being within said interval and compliant with said desired accuracy, and the replacement of the existing code implementing said function by the executable code generated at said second step.

According to an embodiment of this platform, said means are a second computer program adapted for the automatic determination of said call.

Further features and advantages of the invention will appear from the following description of embodiments of the invention, given as non-limiting examples, with reference to the accompanying drawings listed hereunder.

DETAILED DESCRIPTION OF THE INVENTION

The invention aims in optimizing an existing computer program in order to improve its performance by focusing on the calls to functions implementing calculus. What is called "calculus" in the following description comprises notably the calculation of a mathematical functions, especially the ones for which the result cannot be exactly determined but is an approximation determined by a heuristic algorithm. Typical, but not exhaustive, examples are trigonometric functions like sine or cosine, which are widely used in large range of applications. The sine or cosine cannot be directly calculated by a computer, but approximations can be determined by algorithms like Taylor series or Chebyshev polynomials. Descriptions of these two algorithms can be for instance found in the wikipedia participative encyclopedia:

https://en.wikipedia.org/wiki/Taylor_series
https://en.wikipedia.org/wiki/Chebyshev_polynomials Of course, other approximating algorithms are also possible to implement a sine or cosine function. Also, other type of mathematical functions can be considered as "calculus" and addressed by the present invention: Fourier Transforms and other transforms, matrix computing, etc.

All these approaches provide only approximating results mainly because of two reasons. First, because they are based on mathematical series, or other approximation methods, which, by definition, will provide an exact result only after the computation of an infinity of terms. But also, because computers cannot handle "real" values but only approximations, like for instance IEEE754 double precision (DP). This encoding scheme is explained for instance in https://en.wikipedia.org/wiki/IEEE_754.

Figure 1:
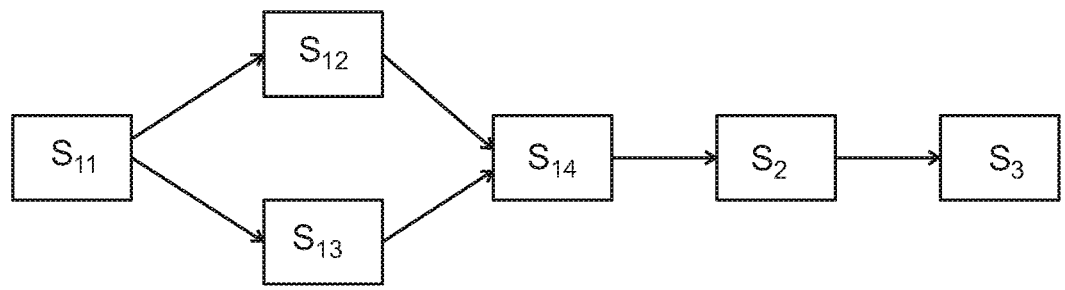
FIG. 1 shows an illustrative dataflow according to embodiments of the invention.

According to the invention, and as depicted in the illustrative dataflow of FIG. 1, a first step S11 consists in determining within a computer program to be optimized the calls to some identified functions. These identified functions are those which implement a calculus as defined here-above. Of course, the method can only focus on a subset of them, or even to one or two of these functions like sine or cosine functions, for example.

In order to gather a substantive sample of values of input parameters, the computer program may be executed several times. At each execution, the value of the input parameter(s) may be stored, so that at the end of the set of executions, a "space" of values is constituted, forming an interval between a minimum and maximum values.

Figure 2:
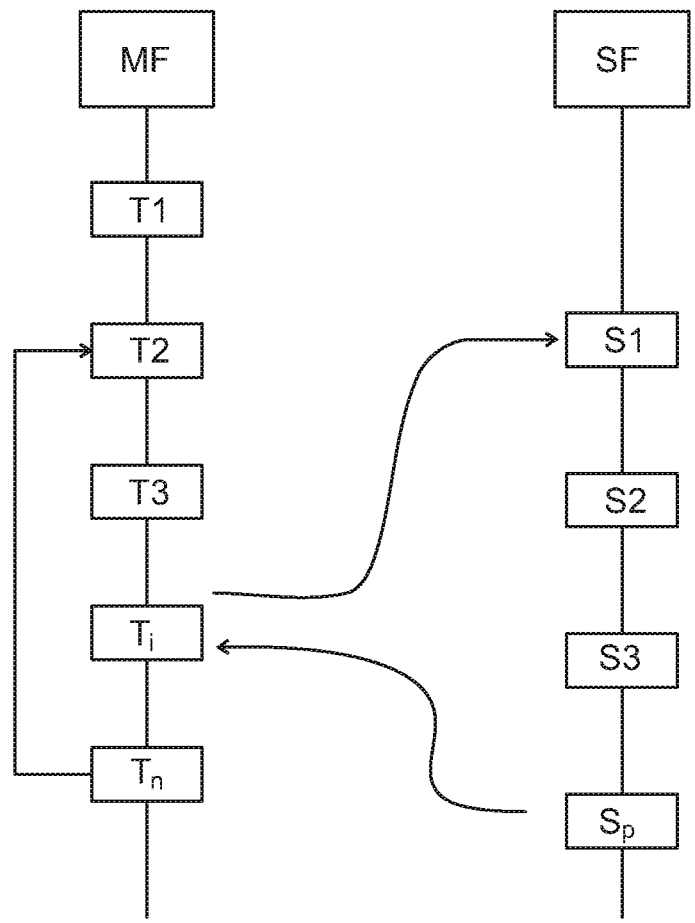
FIG. 2 shows a schematic example of a call to a function, according to embodiments of the invention.

Furthermore, typically, in run-time, a given call to a function may occur many times because of loops in the computer program. Each time, the input parameter of the function are normally different. FIG. 2 illustrates such a schematic example wherein the first vertical line represents the main function MF, made of a sequence of instructions T1, T2, T3 ... Ti ... Tn. At step Tn, the main function loops on instruction T2. Instruction Ti calls the function SF which comprises steps S1, S2, S3 ... Sp. Instruction Sp terminates the function call, and the processing goes on to the instruction subsequent of Ti of the main function MF. The call of the function SF may comply with different format according to software languages and underlying platforms, but it can resemble to $$y=SF(x).$$

wherein SF is an identifier of the function, y is the result (a value or a set of values), and x is the input parameters (a value or a set of values). It can be appreciated in this example that the function SF will be called at each loop within the main function MF. At each loop, the input parameters x should normally be different.

For each call determined at step S11, in a second step S12, the method comprises determining the interval constituted by the values of the input parameters of the function at each occurrence of the calls. In the usual case wherein a given call occurs several times, the different values of the parameters for all these occurrences can be stored, so as to determine the minimum and maximum values. When the function comprises several input parameters, this can be done for all the parameters. These maximum and minimum values form an interval which will be useful for determining if the call is eligible to optimization.

The step S13 can be performed in parallel to step S12, or in sequence with it. It consists in determining a precision desirable for the call. Such a precision, or accuracy, can be determined manually by the developer, according to the computer program that is developed. Also, the accuracy can be determined at least partly on the basis of the environment of said call within the computer program. This environment may comprise the instructions making use of the result of the function. According to an embodiment, this environment may be looked at within a "window", which may comprise the some previous instructions before the call and some subsequent instructions after the call. In the example of FIG. 2, such window may be formalized as a subset of instructions [Ti−α; Ti+β] of the main loop MF, wherein α and β are two configuration parameters. α may be zero so that only subsequent instructions are taken into account for determining the environment. Through automatic analysis of these instructions, it is possible to get information about how is used the result of the function within the main function. In particular, according to how the result is processed by subsequent instructions, one can determine the impact of its accuracy on the accuracy on the results of these subsequent results. A trivial example is the rounding of the result function as a subsequent instruction, like in the following example:

$$y=\sin(x);$$

$$z=\text{round}(y;4).$$

wherein the "4" means that z is rounded at 4 digits after the point. In such a trivial situation, it would be unnecessary to compute y=sin(x) with a higher accuracy, since the additional computed data will be lost by the subsequent instructions (i.e. the "round" instruction).

At step S14, it is then possible de determine whether the call is eligible to optimization if it corresponds to two criteria: a first criterion according to which the interval determined at step S12 is substantially smaller than the range of possible values for the input parameter(s); a second criterion corresponding to the desired accuracy of the result of the function, determined at step S13.

The determined interval should be small enough in comparison with the range of possible values so as some specific characteristics can be associated to this interval. In other words, it should be the trigger of the determination of a particular implementation of the function that would be appropriate within this interval. Consequently, the granularity of the relevant interval and, thus, the meaning of the term "substantially smaller" depends on the function which call needs to be optimized. For some functions, some characteristics can be determined for a proximity to zero, for instance, triggering a specific implementation; for other functions the relevant intervals could be positive and negative values of a parameter, etc.

According to a particular embodiment, different implementations can each be associated with a relevant interval. Then, the interval determined at step S12 can be compared with these interval. If an interval encompassing this determined interval is found, and if a desired accuracy has been determined, then, the call is eligible to optimization.

Once a call of a function has been determined as meeting both criteria, an executable code is automatically generated in a step S2 for minimizing the execution time for this function, when the input parameters fall within the previously determined interval and given the fact that the computed accuracy can be relaxed to the previously determined accuracy. In other words, it is assumed that the sample on which the interval of the input parameters is determined is relevant enough (e.g. large enough) so as the subsequent executions computer program will produce parameter values for this call within this same interval.

The executable code for implementing the function is chosen according to both this interval and the desired accuracy. This desired accuracy can act both as a degree for freedom, allowing larger choices of implementations, but also as a parameter to further optimize the chosen implementation. In consequence, both criteria works with synergy for defining the most relevant executable code implementing the function.

For instance, some implementations of a function comprise a sequence of code expressions, each associated to a term of a mathematical series approximating this function. Then, the number of these terms (and thus of code expression) is determined by this desired accuracy. Accordingly, the generated executable code is optimized as comprising only the minimal number of terms allowing to reach the desired accuracy (given the fact that any additional term will provide useless additional accuracy and increase the overall execution time due to these additional terms to compute).

Concrete examples can be provided with regard to mathematical functions like trigonometric functions (sine, cosine . . . ). If the determined interval is close to zero, an implementation based on Taylor series can be selected. Otherwise, an implementation based on Chebyshev polynomials can be selected. Then, the desired accuracy can be used to refine the executable code to be generated for implementing the function. Of course, other implementations are possible, but for the clarity and conciseness of the description, a example based on these 2 implementations will be described. The skilled person will be able to derive how to adapt this example to other implementations.

Taylor series are well-known technics to approximate mathematical functions like trigonometric functions. In theory, an infinite series provide the exact result, but in digital computing, the series should obviously be limited to a certain number N of terms.

$$\sin x = \sum_{n=0}^{N} \frac{(-1)^n}{(2n+1)!} \cdot x^{2n+1}$$

$$\cos x = \sum_{n=0}^{N} \frac{(-1)^n}{(2n)!} \cdot x^{2n}$$

$$\tan x = \sum_{n=0}^{N} \frac{B_{2n}(-4)^n(1-4^n)}{(2n)!} \cdot x^{2n-1}$$

$$\arcsin x = \sum_{n=0}^{N} \frac{(2n)!}{4^n (n!)^2 (2n+1)} \cdot x^{2n+1}$$

wherein $B_{2n}$ are the Bernoulli numbers.

Then the desired accuracy can be used to determine the number N of terms of the series which needs to be computed. According to the selected implementation algorithm and this determined number N, the executable code can be automatically generated.

Then, with a desired accuracy determining N=5, the generated execution code could look as:

```
double mysin3(const double x)
{
  double x2, z;
  x2 = _mul_rn(x, x);
  z = (0.00833333333333333333333333333);
  z = _fma_rn (z, x2, (-0.166666666666666666666667));
  z = _fma_rn (z, x2, 0.);
  z = _fma_rn (z, x, x);
  return z;
}
``` wherein _fma is the classical "fused multiply and add" function, and_mul is a simple multiplication.

With a larger number N of terms, the generated execution code can look as:

```
double mysin26(const double x)
{
  double x2, z;
  x2 = _mul_rn(x, x);
  z = (-6.44695964045717268045417783425 21e-67);
  z = _fma_rn (z, x2, (1.6439747083165790335158153477343e-63));
  z = _fma_rn (z, x2, (-3.8666285139605938868291976978711e-60));
  z = _fma_rn (z, x2, (8.3596508471828039833247254227972e-57));
  z = _fma_rn (z, x2, (-1.6552108677421951886982956337138e-53));
  z = _fma_rn (z, x2, (2.9893108271424045107891219144872e-50));
  z = _fma_rn (z, x2, (-4.9024697565135433976941599397 59e-47));
  /*** 15 similar lines not shown for concisness of the disclosure ***/
  z = _fma_rn (z, x2, (-0.000198412698412698412698412 7));
  z = _fma_rn (z, x2, (0.00833333333333333333333333333));
  z = _fma_rn (z, x2, (-0.166666666666666666666667));
  z = _fma_rn (z, x2, 0.);
  z = _fma_rn (z, x, x);
  return z;
}
```

As for Chebyshev polynomials, several approaches can be used. According to an embodiment, the sub-problem to address consists in finding the combination of Chebyshev polynomials which optimize the approximation within the determined interval. These polynomials Pi have the property of defining a base (in the mathematical meaning). Then a function f(x) can be approximated by n Chebyshev polynomials:

$$f(x) = \Sigma_{i=1}^{n} a_i P_i(x)$$

The determination of the coefficients ai can be made by resolutions of equations, which can be automatically performed by a formal calculus tool. By using the language of a well-known tool like the Mathematica software product, the determination of the coefficient can be done by the following code:

```
scale[x_] := ((8/(3*Pi))*(x) - (8/(3*Pi^3))*(x^3))^(-1);
indices := {RANGE};
inner[g_, h_] := NIntegrate[(g*h)/(Sqrt[1-x^2]), {x, -1, 1},
    WorkingPrecision -> 120, PrecisionGoal -> 25 ];
cheb[i_] := inner[ ChebyshevT[i,x], scale[BOUNDARY*x]*Sin
    [BOUNDARY*x]]/inner[ChebyshevT[i,x], ChebyshevT[i,x]];
coeffs=cheb/@indices;
apxi[i_] := coeffs[[1+i/2]]*ChebyshevT[i,z];
sine[x_] := scale[x]^(-1) * Total[apxi /@indices] /. {z -> x/
    ( BOUNDARY) };
``` wherein BOUNDARY is the upper limit to the interval, and RANGE is the serial of indices of the coefficients to be determined; This example derives from the teachings of the article fount at the following URL: http:////mooooo.ooo/chebyshev-sine-approximation.

Then, these coefficients can be introduced to the execution code to be generated. In particular, in the case the coefficients were determined by a formal calculus tool like "Mathematica", the coefficients may be converted and displayed. A code for doing so could be:

$P:=N[\text{Expand}[\text{sine}[x]], 22]$;

For[$i=1, i<\text{MAX}, i=i+2$,Print[CForm[Coefficient[$P,x, i$]]]]

Then, the coefficient can be used, in a similar way than in the case of Taylor series above. For instance for an interval determined by BOUNDARY=$2\pi$, a generated execution code can be:

```
double mysin3(const double x)
{
    double x2, z;
    x2 = _mul_rn(x, x);
    z = (0.0024484143776401955266611);
    z = _fma_rn (z, x2, (-0.10858218506911 69157382));
    z = _fma_rn (z, x2, (0.8331653926375413273273));
    z = _fma_rn (z, x, 0.);
    return z;
}
```

Or, for a higher precision, or accuracy:

```
double mysin26(const double x)
{
    double x2, z;
    x2 = _mul_rn(x, x);
    z = (-5.369196481185774086993e-67);
    z = _fma_rn (z, x2, (1.619189653949213 65023e-63));
    z = _fma_rn (z, x2, (-3.8630050076783408 70269e-60));
    z = _fma_rn (z, x2, (8.3592765296216708 08748e-57));
    z = _fma_rn (z, x2, (-1.6552079719523292 13549e-53));
    /*** 15 similar lines not shown for conciseness of the disclosure ***/
    z = _fma_rn (z, x2, (-2.50521083854417 1877505e-8));
    z = _fma_rn (z, x2, (2.7557319223985890 65256e-6));
    z = _fma_rn (z, x2, (-0.00019841269841 26984126984));
    z = _fma_rn (z, x2, (0.00833333333333333333333));
    z = _fma_rn (z, x2, (-0.166666666666666666666667));
    z = _fma_rn (z, x2, (1.));
    z = _fma_rn (z, x, 0.);
    return z;
}
```

Unlike Taylor series, the coefficients depend on the desired accuracy, i.e. the RANGE value in the above algorithm, and on the interval, i.e. the BOUNDARY value. The Chebyshev polynomials provide an approximation with an accuracy nearly flatly constant for all possible values of the input parameters inside the RANGE (at least compared to the approximation provided by Taylor serials). However, Taylor serials provide a better approximation close to zero, so that for a given desired accuracy, less terms are required, implying a better optimization in terms of processing time.

Again, many other implementation algorithm can be used to approximate the function, each with different characteristics in terms of accuracy, accuracy vs. interval balance, processing time, etc. The more implementation algorithms are available, the more relevant can be the determination of the execution code to be generated.

Once, the execution code is generated, it will replace the previously-used execution code which implemented the called function. This replacement step S3 can be performed by simply appending the execution code to the global code of the computer program, and replacing the call to the function by a call to this new implementation of the function (i.e. without necessarily removing the former implementation, which might be used for implementing the function with regards to other call to it throughout the computer program).

The invention has been described with reference to preferred embodiments. However, many variations are possible within the scope of the invention.

The invention claimed is:

1. Method of optimization of a computer program, comprising:
   determining within said computer program a call in runtime of a function having at least one input parameter, said call corresponding to a first criterion according to which said at least one input parameter is inside an interval smaller than the range of possible values for said input parameter, said interval being formed by sample values stored for several executions of said program, and to a second criterion corresponding to a desired accuracy for said call;
   automatically generating an executable code for implementing said function, minimizing execution time for said at least one input parameter being within said interval and compliant with said desired accuracy, by choosing an implementation according to said interval and said desired accuracy and by determining parameters of said implementation according to said desired accuracy;
   replacing an existing execution code implementing said function by the executable code generated by the automatically generating of the executable code.

2. Method according to claim 1; wherein determining within said computer program comprises the automatic triggering of a set of executions for said computer program and the automatic analysis of said execution for measuring for each of said calls the value of said at least one parameter so as to determine said interval.

3. Method according to claim 1, wherein said desired accuracy is determined at least partly on the basis of the environment of said call within said computer program.

4. Method according to claim 1, wherein automatically generating the executable code comprises generating code expressions, each associated to a term of a mathematical suite approximating said function, wherein the number of said code expressions is determined by said desired accuracy.

5. Method according to claim 1, wherein said function is a trigonometric function.

6. Method according to claim 5, wherein automatically generating the executable code consists in generating a first execution code based on Taylor series, or a second execution code based Chebyshev polynomials.

7. Method according to claim 6, wherein automatically generating the executable code consists in generating said first execution code based on Taylor series if said interval is close to zero, and said second execution code based on Chebyshev polynomials otherwise.

8. A platform for the optimization of a computer program, comprising:
   a computer, wherein the computer is configured to execute one or more programs comprising:
   a second computer program configured to determine within said computer program of a call of a function in runtime having at least one input parameter, said call corresponding to a first criterion according to which said at least one input parameter is inside an interval smaller than the range of possible values for said input parameter, said interval being formed by sample values stored for several executions of said program, and to a second criterion corresponding to a desired accuracy for said call;
   a computer program configured to automatically generate an executable code for implementing said function, minimizing execution time for said at least one input parameter being within said interval and compliant with said desired accuracy, by choosing an implementation according to said interval and said desired accuracy and by determining parameters of said implementation according to said desired accuracy, and the replacement of an existing execution code implementing said function by the executable code generated at said second step.

9. Platform according to claim 8, wherein said means are the second computer program adapted for the automatic determination of said call.

10. Platform according to claim 8, wherein said computer program comprises instructions to generate code expressions, each associated to a term of a mathematical suite approximating said function, wherein the number of said code expressions is determined by said desired accuracy.

* * * * *